Oct. 7, 1941.  N. ERLAND AF KLEEN  2,257,735
ABSORPTION REFRIGERATING SYSTEM
Filed Jan. 20, 1938    5 Sheets-Sheet 2
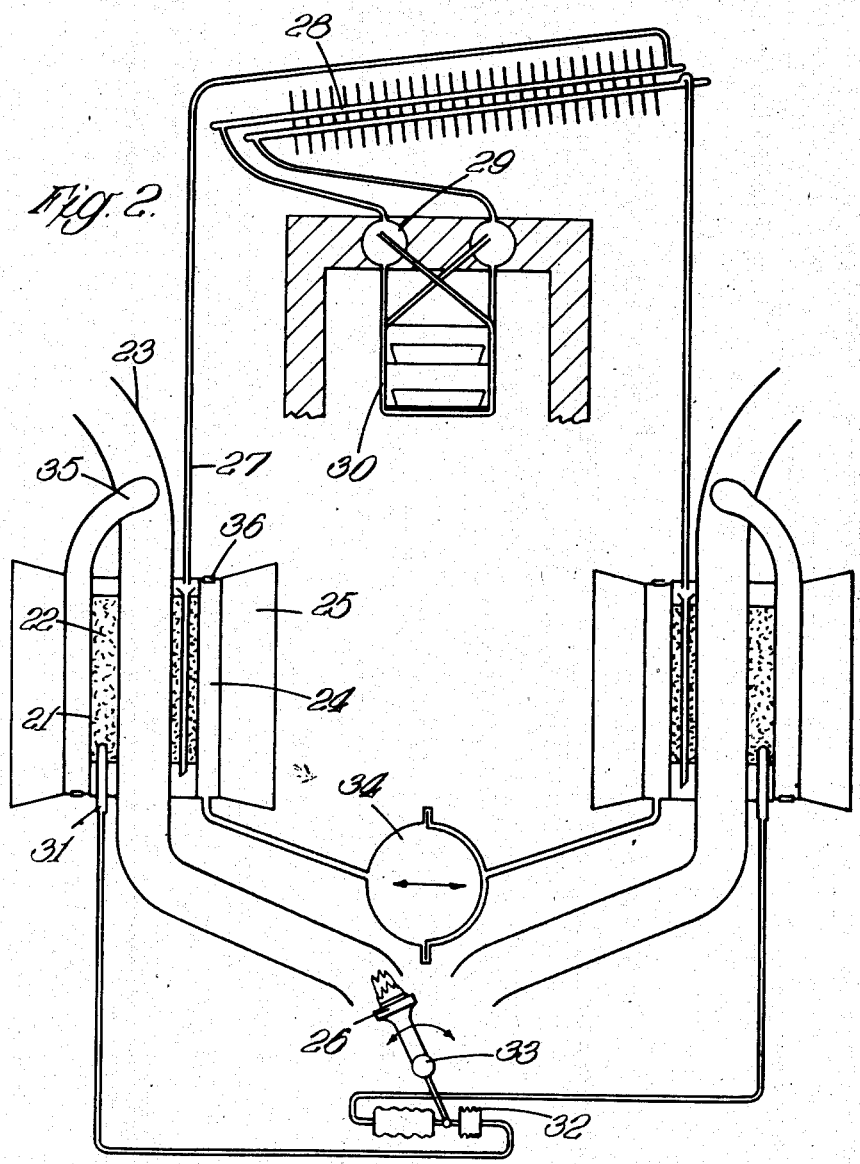
INVENTOR
NILS E. af KLEEN
By Norris & Bateman
ATTORNEYS Oct. 7, 1941.  N. ERLAND AF KLEEN  2,257,735
ABSORPTION REFRIGERATING SYSTEM
Filed Jan. 20, 1938  5 Sheets-Sheet 3

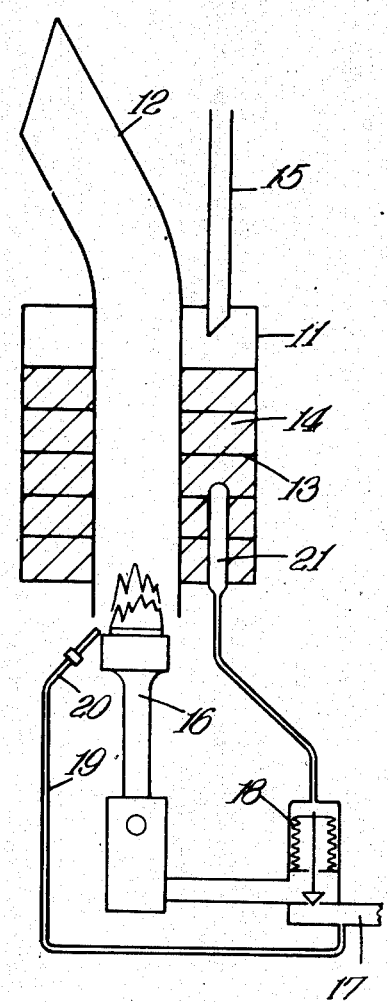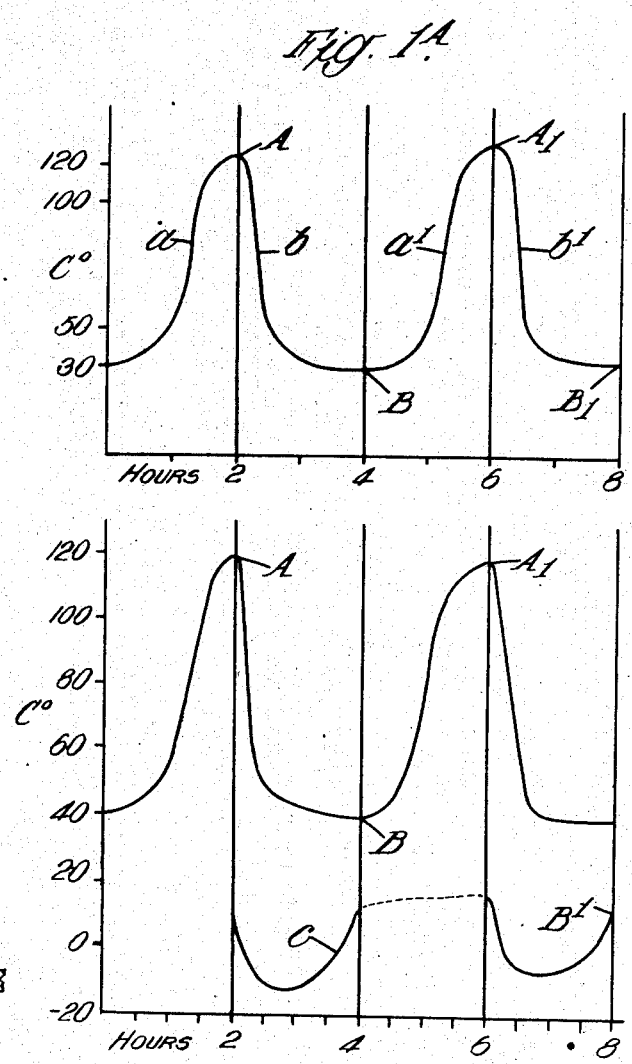

INVENTOR
NILS E. af KLEEN
By Norris & Bateman
ATTORNEYS

Oct. 7, 1941.   N. ERLAND AF KLEEN   2,257,735
ABSORPTION REFRIGERATING SYSTEM
Filed Jan. 20, 1938   5 Sheets-Sheet 4

INVENTOR
NILS E. af KLEEN
By Norris & Bateman
ATTORNEYS

Oct. 7, 1941.   N. ERLAND AF KLEEN   2,257,735
ABSORPTION REFRIGERATING SYSTEM
Filed Jan. 20, 1938   5 Sheets-Sheet 5

INVENTOR
NILS E. af KLEEN
By Norris & Bateman
ATTORNEYS

Patented Oct. 7, 1941

2,257,735

UNITED STATES PATENT OFFICE 2,257,735

ABSORPTION REFRIGERATING SYSTEM

Nils Erland af Kleen, London, England

Application January 20, 1938, Serial No. 185,978
In Great Britain January 22, 1937

4 Claims. (Cl. 62—5)

The present invention relates to absorption or adsorption refrigerating systems of the kind employing one or more intermittently operating units and where more than one unit is used there is obtained substantially continuous refrigeration. Each unit includes a generator-absorber, condenser and an evaporator. For convenience hereinafter the term "adsorption" may be taken as included within the term "absorption."

It has already been proposed to employ two intermittently operating units arranged to function alternately by automatically tilting the generator-absorbers, or in some instances the liquid refrigerant collecting tanks, to obtain continuous refrigeration in such a manner that one of the units controls the other. It is preferable with absorption refrigerating systems to eliminate as far as possible moving parts and it is the object of the present invention to provide an absorption refrigerating system embodying one or more intermittently operating units in which moving parts have been substantially eliminated, such a system operating simply and reliably and with an overall efficiency greater than has been obtained hitherto.

The invention contemplates the provision of a method for controlling or regulating the heating-up or vaporising period of the generator-absorber (during which period the refrigerant is driven off in the form of a vapour) and the absorption period (during which the refrigerant is absorbed in the absorbent).

It is known that for different absorbents and different refrigerants the amount of refrigerant which can be absorbed or adsorbed up to saturation differs in each case. Let it be assumed, for example, that calcium chloride is the absorbent and ammonia the refrigerant then the absorbent can absorb (or be saturated with, at normal temperatures) eight molecules of the refrigerant, or in other words, 1 kg. of calcium chloride can absorb 1.225 kgs. of ammonia; now in order not to cause a deterioration of the refrigerant and/or absorbent the temperature must not be raised above the critical temperature of ammonia and it is found that six molecules only of ammonia can safely be driven off, for to drive off the full eight molecules will require a temperature greater than the critical temperature of the refrigerant with consequent deterioration thereof.

The improved method of the invention resides in the control of the refrigerating process in accordance with the temperature conditions of the absorbent in such manner that when the absorbent has reached a predetermined temperature (for example, during the heating-up or vaporising period) the heat supply to the absorbent is cut off and when the temperature in the absorbent has fallen to a predetermined value (e. g. during the absorption period) the heat is again supplied to the generator-absorber. In other words the temperature conditions obtaining in the absorbent control and regulate the cycle of operations in the refrigerating process. When ammonia is used as the refrigerant and a dry salt such as strontium chloride is used as the absorbent, the temperature at which the heat supply is cut off is so chosen that two molecules of refrigerant per molecule of absorbent remain in the generator at the end of the heating period.

Where two or more intermittently operating units are employed to give substantially continuous refrigeration the method of this invention may be applied so that the temperature conditions obtaining in the generator-absorber of one unit control the cutting-off of the heat supply to said unit and the switching over of said heat supply to the next unit in sequence. This operation takes place in a cycle from one unit to the next, if there be more than two, until the operation is repeated in the first unit.

As an example an absorption refrigerating system includes two intermittently operating units each comprising a generator-absorber, condenser and evaporator.

Heat may be supplied to each generator-absorber by means of gas, electricity, oil or in any other manner.

The arrangement of the two intermittently operating units is such that when the one is being heated to drive off refrigerant vapour to the condenser and evaporator, the other is absorbing back refrigerant driven off in the previous cycle, resulting in substantially continuous refrigeration.

More specifically a refrigerating system as indicated above comprises two generator-absorbers, two condensers, preferably built into a single unit but functioning independently and an evaporator embodying two separate collecting tanks and two sets of cooling coils.

Each generator-absorber includes a chamber for the absorbent which may be water, one of the halogen salts, such as strontimum chloride or other suitable absorbent and the refrigerant may be ammonia (which is absorbed very readily by, for example, strontium chloride) or other refrigerant. This chamber is surrounded by a cooling jacket and cooling fins. Passing centrally through this chamber is a heating flue whilst a thermostat is inserted in said chamber. On the application of heat the refrigerant vapour is driven off from the generator-absorber and passes to its associated condenser, where it is condensed and the condensed refrigerant collects in its associated collecting tank and at the same time surrounds the evaporator coils, this action taking place during the heating-up period of the one generator-absorber.

When the temperature of the absorbent in the one generator-absorber reaches a predetermined value the thermostat associated with that generator-absorber operates to switch the source of heat from the first to the second generator-absorber, the second generator-absorber then functioning in a manner similar to that described for the first generator-absorber. The first generator-absorber now commences to re-absorb the refrigerant from the collecting tank and evaporating coils, this absorption creating cold in the evaporator coils. The above operation is then repeated with the second generator-absorber.

The heat supply is controlled to heat up the one generator-absorber at a rate corresponding with the absorption of the refrigerant by the other generator-absorber and the control of the application of heat may be such that with falling evaporator temperatures the supply of heat is reduced. The thermostat is adjustable so that the heating up period may be regulated as desired to obtain maximum efficiency.

It will be clear that the switching over of the heat source from the one generator-absorber to the other may be effected in a number of ways different from that described above, for example, a shutter or damper could be arranged in the heating flue to permit or prevent the application of heat to that flue and furthermore, to facilitate the cooling of the one generator-absorber for the absorption period, a second shutter could be arranged in the heating flue to open simultaneously with the closing of the damper to permit cooling air to flow through said flue.

If electrical heating means be employed any suitable well-known switching over device may be used.

The switching over of the heat supply from the one generator-absorber to the other should preferably be effected when the temperature in the first generator-absorber has risen to a predetermined value which in the case of ammonia is approximately 120° C. With other refrigerants and/or other absorbents this temperature will be either greater or less but in all cases the switching over should be rapid when the predetermined temperature is reached and for this purpose the thermostat or other device should be arranged to have a snap action.

As an alternative to gas, electricity or oil heating the generator-absorber may be heated by the circulation of a heating fluid and in this case also the change over from the one generator-absorber to the other should be as rapid as possible.

It is well-known that absorbents deteriorate when called upon to re-absorb liquid refrigerant and to prevent this suitable traps or other means may be employed in the circulatory system to prevent liquid refrigerant passing directly from the collecting tank to the generator-absorber, any liquid refrigerant being trapped and fed back to the bottom of the generator-absorber where it may evaporate before absorption.

As indicated above the heating up period of the one generator-absorber should correspond closely with the evaporating and absorption period of the other generator-absorber and to ensure that these periods do closely correspond auxiliary mechanism operated automatically or manually may be supplied.

Each generator-absorber may be cooled during the evaporating and absorption period by the circulation of cooling fluid in a secondary system or may be air cooled either naturally or forced.

The invention will now be described in greater detail, reference being had to the accompanying drawings, of which Figure 1 shows, somewhat diagrammatically, an application of the invention to a single intermittently operating unit;

Figure 1A is a diagram showing the cyclical control of the source of heat;

Figure 1B is a view similar to Figure 1A showing the function of an additional device arranged in the system for controlling the source of heat;

Figure 2 shows diagrammatically the application of the invention to two intermittently operating units functioning alternately;

Figure 3:
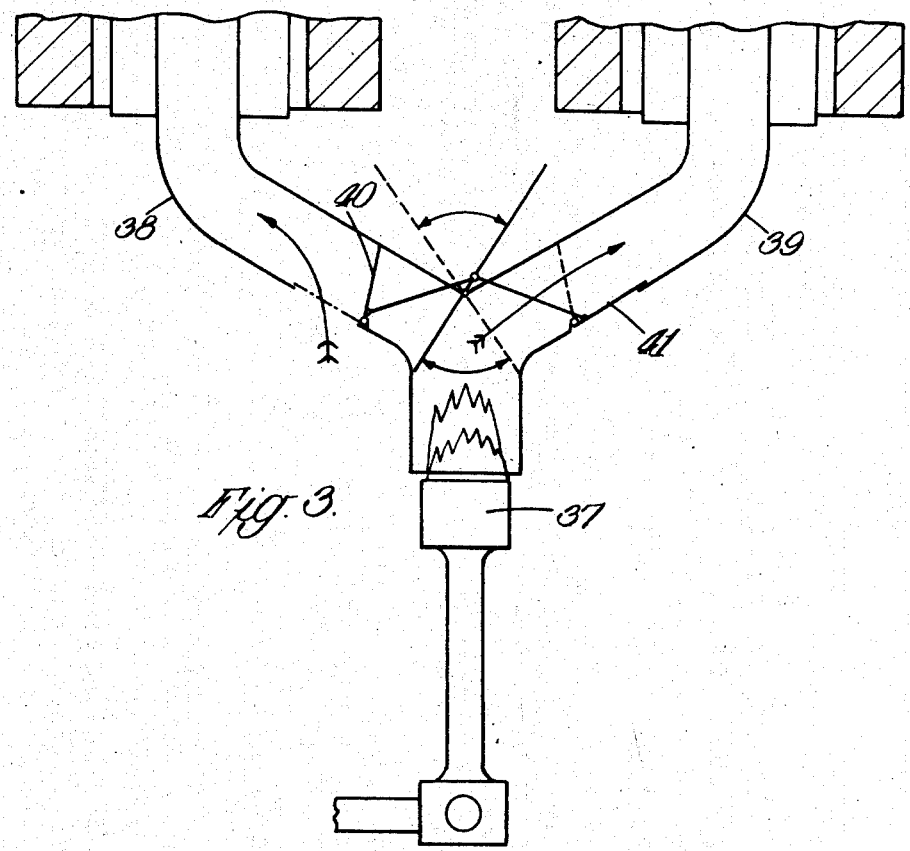
Figure 3 is a modification of the invention of Figure 2.

Referring to Figure 1 the boiler-absorber 11 surrounding the heating flue 12 carries trays or pockets 13 for the reception of a dry salt 14, such as strontium chloride. An outlet pipe 15 conveys gaseous refrigerant to the condenser, collecting tank and evaporator (not shown) in the usual manner. The boiler-absorber 11 is heated by means of the gas burner 16 although it should be understood that any other source of heat may equally well be applied.

Gas is supplied to the burner 16 from the pipe 17 through a bellows operated cut-out valve 18, a by-pass pipe 19 feeding the pilot jet 20. Carried within the boiler absorber 11 is a thermostat 21 connected with the bellows of the cut-out valve 18, in such a manner that when the temperature reaches a predetermined value the valve 18 operates to close the gas inlet to the burner 16.

Figure 1A is a curve of temperature with respect to time, the portion $a$ of the curve shows the heating up period before the thermostat is operated to cut off the supply of gas. At the point A the thermostat operates, the gas supply is cut off and the temperature of the boiler-absorber cools in accordance with the curve $b$ and when the point B is reached the thermostat cuts out and the operation is repeated over the curves $a'$ and $b'$.

Figure 1B is similar to Figure 1A and shows the cycle of operations when the switching on and off of the source of heat is dependent on a thermostat arranged in any other part of the system, for example, in juxtaposition to the evaporator. The curve $c$ indicates the temperature in such part of the system, at which temperature the auxiliary thermostat is actuated.

Figure 2 shows two alternately and intermittently operating units and the following description will be limited to the one unit, it being understood clearly that the cycle of operations of the second unit is identical with, but out of phase with, the first unit.

The boiler-absorber 21 carrying the dry salts 22, such as strontium chloride, surrounds the heating flue 23 and is itself surrounded by a cooling jacket 24 and fins 25. A gas burner 26 supplies heat to the flue 23 and refrigerant vapour is driven off through the outlet pipe 27 to the condenser 28 where it condenses and flows to the collecting tank 29 whence it circulates through the evaporator coils 30. A thermostat 31 is placed within the boiler-absorber in firm contact with the dry salts 22 and is connected with a bellows device 32 controlling the rocking movement of the burner 26 about its pivot 33.

The drawing shows also a secondary cooling system in which a heat conducting medium is placed within the cooling jacket 24 during the absorbing period and is dispelled therefrom to a condenser 34 common to both intermittently operating units during the heating up period. The expulsion of the heat conducting medium is effected by heating the medium in the jacket through the intermediary of the portion 35 disposed within the heating flue 23. The fins 25 are insulated from the boiler-absorber 21 by the cork or like insulating pieces 36.

When the temperature of the absorbent in the boiler-absorber which is acting for the time being as a generator reaches a predetermined value, the thermostat 31 associated with that boiler-absorber operates to switch over the burner 26 so as to heat up the second boiler-absorber and to permit the first boiler-absorber to cool. When the temperature of the absorbent in the second boiler-absorber reaches a predetermined value, the thermostat 31 associated with the second boiler-absorber operates to switch the burner 26 back to the first boiler-absorber. The two units thus operate alternately, each change over being effected when the temperature of the boiler-absorber which is acting for the time being as a generator reaches a predetermined value.

According to Figure 3 the burner 37 is fixed and the heat is permitted to pass to the one or the other heating flue 38 or 39 in accordance with the position of vanes 40, 41, hinged in said flue, the movement of said vanes being under the control of a thermostat in a manner similar to that described in connection with Figure 2. In the drawings the right hand boiler-absorber is shown as being heated, the vane 41 being open to the flue 39 whereas cool air is admitted to the flue 39 through the now open vane 40 to assist in cooling the left hand boiler-absorber throughout its absorption period.

Figure 4:
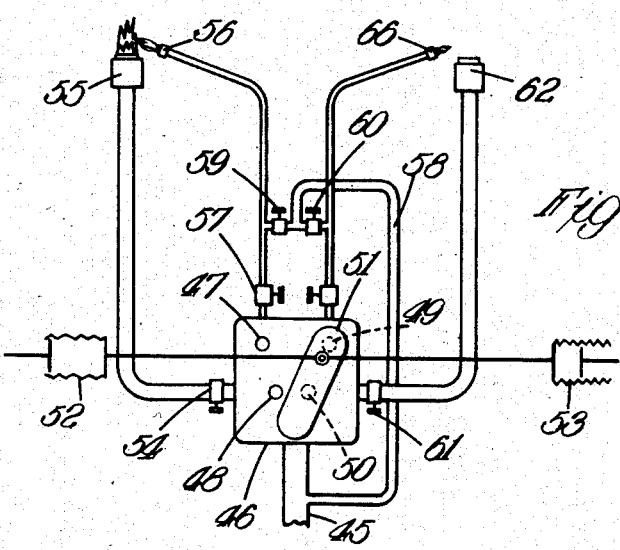
Figure 4 shows schematically the control of the supply of the heat source.

Figure 4 shows diagrammatically one gas supply piping arrangement. Gas is admitted through the pipe 45, to a chamber 46 formed with two sets of ports 47, 48 and 49, 50 which are arranged to be closed by a disc valve 51, actuated by opposed bellows devices 52, 53, connected with thermostats (not shown) in a manner similar to that already described.

With the ports 49, 50 closed, gas passes from port 48, through reducing valve 54 to the one burner 55 whilst the pilot jet 56 is connected through reducing valve 57 to port 47. A continuous supply of gas to the pilot jets 56 and 66 passes through the branch pipe 58 through reducing valves 59 and 60. When the valve 51 switches over, supply to the burner 55 is cut off and gas now passes through reducing valve 61 to burner 62, an increase in pressure occurs at the jet 66 and the burner 62 lights up.

Adjustment of the supply is effected by means of the several reducing or throttle valves. A flapper or other valve may be used in place of the disc valve described.

Figure 5:
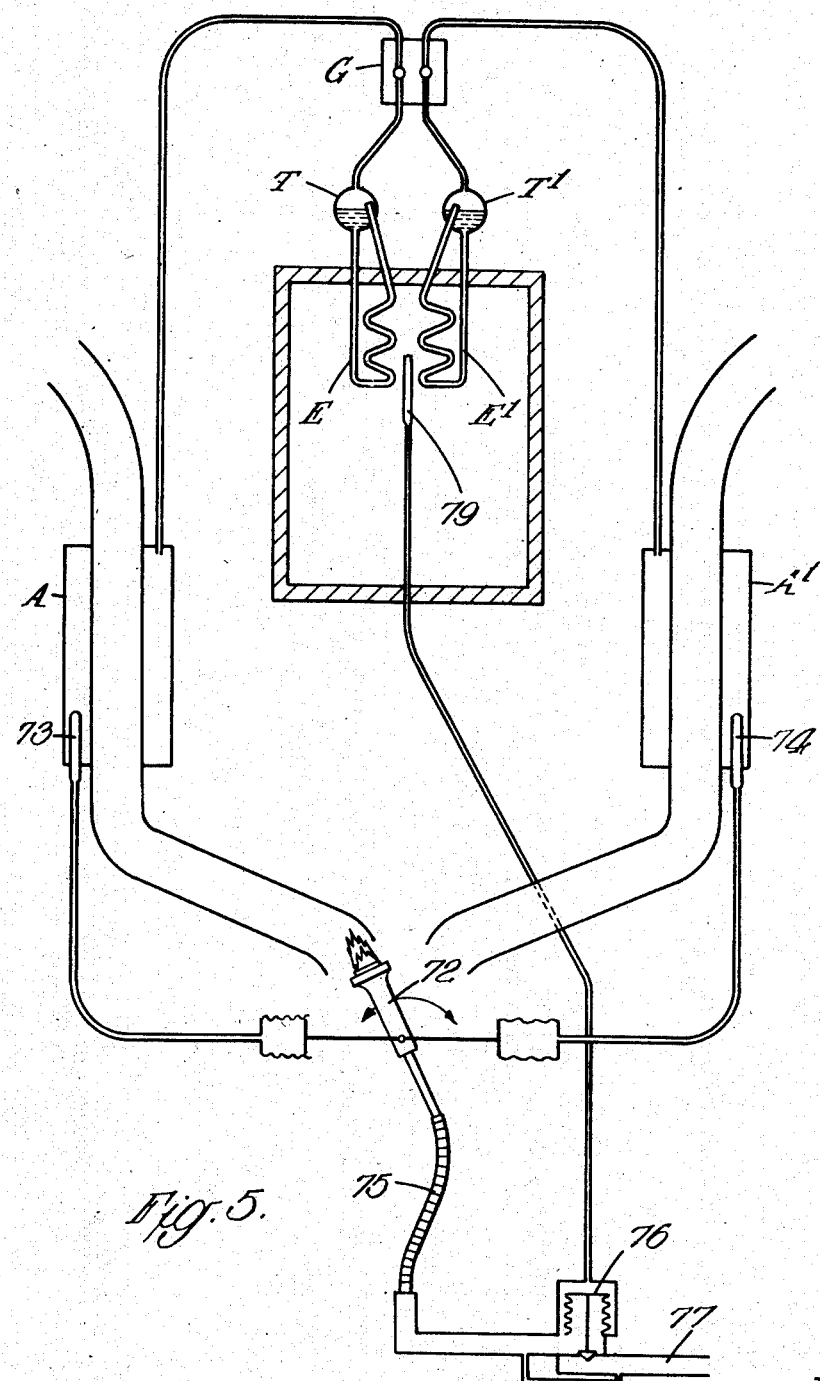
Figure 5 is a view similar to Figure 2 of yet a further modification of the invention.

Figure 5 shows the control in a two unit alternately operating system, in accordance with predetermined temperatures in a specific part of the system, e. g. in the cabinet of the refrigerator.

The two boiler absorbers A and A' are connected with a condenser C, two collecting tanks T and T' and evaporator coils E and E' arranged within a cabinet 71, shows diagrammatically. A gas burner 72 is arranged to be rocked by thermostats 73 and 74 in a manner similar to that described in connection with Figure 2.

Gas supply to the burner 72 is through a flexible pipe length 75, through a throttle valve 76 from the main 77, a by-pass 78 maintaining the supply to keep the flame burning. The throttle valve 76 is actuated in response to a thermostat 79 arranged in proximity to the evaporator within the cabinet.

It is essential that the thermostats 73 and 74 actuate the burner 72 with a snap action, but the thermostat 79 need not have such action.

Figure 6:
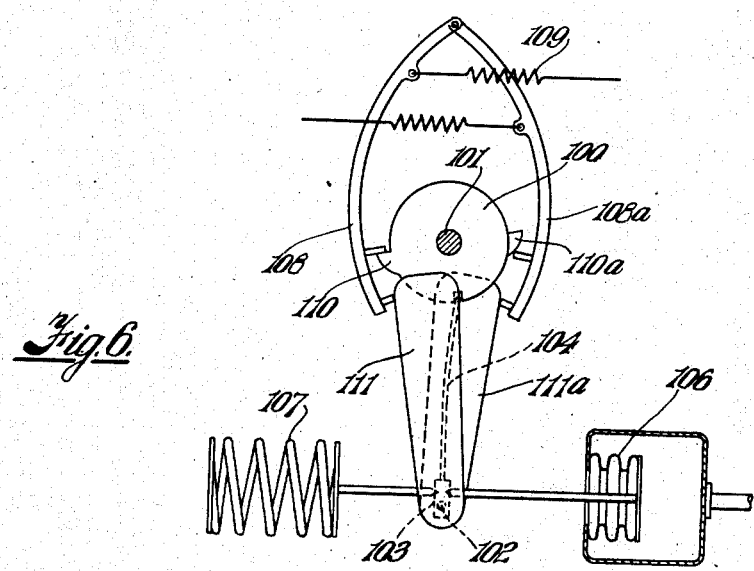
Figures 6 and 7 are diagrammatic illustrations of a snap action mechanism for the thermostatic control.
Figure 7:
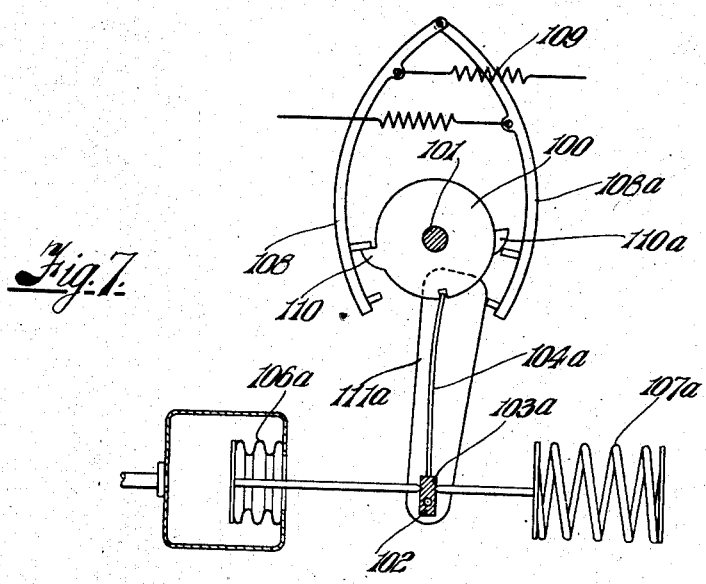

A preferred form of snap action switching mechanism is illustrated diagrammatically in Figures 6 and 7 of the drawings.

The mechanism comprises an actuating spring 104 adapted to be gradually loaded by the action of a bellows device 106 and a detent 108 adapted to release the spring so as to bring about a sudden actuation of the switching mechanism when the temperature of the thermostat reaches a predetermined value.

The spring 104 takes the form of a springy plate fixed at one end to a block 103 mounted so that it is free to rotate on a spindle 102 mounted on suitable fixed supports. The bellows 106 tends to rock the block 103 and plate 104 to the left as seen in the drawing and a control spring 107 is arranged to act in opposition to the bellows.

The upper end of the springy plate 104 engages in a recess formed in a drum 100 fixed to a rock-shaft 101 supported in suitable bearings (not shown) fixed above the spindle 102, the arrangement being such that the pressure of the bellows 106 acting through the plate 104 tends to rotate the drum 100 in the clockwise direction as seen in Figure 6.

The detent 108, which is controlled by a spring 109, is arranged to engage a ratchet tooth or like projection 110 on the drum 100 so as to hold the drum against rotation in the clockwise direction. A rigid lever 111 fixed to the block 103 is arranged to engage and move the detent 108 so as to disengage the same from the tooth 110 when the temperature of the thermostat connected to the bellows 106 reaches a predetermined limit. As the bellows 106 expands with rising temperature, the springy plate 104 is gradually loaded. At the same time the detent 108 is gradually displaced by the action of the lever 111. When the set temperature is reached, the detent 108 clears the tooth 110 and the drum 100 and rock shaft 101 then receive a sudden partial rotation in the clockwise direction under the action of the spring 104.

A detent 108ᵃ similar to the detent 108 is arranged to lock the drum 100 in its new position by engagement with a tooth 110ᵃ similar to the tooth 110, and a lever 111ᵃ is provided for the purpose of disengaging the detent and thereby permitting the drum 100 to be restored to its first position at the appropriate time.

In the case of a single unit system such as that shown in Figure 1 of the drawings, where there is only one thermostat, the lever 111ª may be fixed to the block 103. In such case, as the bellows 106 contracts with falling temperature the pressure of the control spring 107 will tend to impart anti-clockwise rotation to the drum 100 through the medium of the plate 104. As the temperature continues to fall, the springy plate 104 is gradually loaded and the detent 108ª is gradually displaced. At a predetermined temperature, the detent 108ª clears the tooth 110ª and the drum 100 and shaft 101 are then suddenly restored to the position shown in the drawings under the action of the springy plate 104.

In the case of a two-unit system such as that shown in Figure 2, in which two thermostats are employed, one of the thermostats is connected to the bellows 106 and the other is connected to a second bellows 106ª (see Figure 7). A separate block 103ª, springy plate 104ª and control spring 107ª are provided in connection with the bellows 106ª, these parts being similar to the parts 103, 104 and 107 previously described, but being arranged to work in the opposite direction so that the expansion of the bellows 106ª tends to rotate the drum 100 in the anti-clockwise direction. In this case, the lever 111ª is fixed to the block 103ª so that the release of the detent 108ª will be effected by the expansion of the bellows 106ª and will occur when the temperature of the thermostat connected to the bellows 106ª reaches a preset limit. In Figure 7 of the drawings, the parts 106, 107, 103 and 111 are omitted in order to permit the parts 103ª and 104ª to be seen.

It will be appreciated that the movements of the rock shaft 101 can be utilised for actuating the rocking burner shown at 26 in Figure 2 or for operating any gas valve mechanism or electrical switch mechanism for effecting the required change over.

The snap action thermostatic controlling device herein disclosed is claimed per se in my divisional application Serial No. 299,774, filed October 16, 1939.

I claim:

1. In absorption refrigerating apparatus of the intermittent type, including at least two generator-absorbers, means for heating said generator-absorbers, and means for selectively switching said heating means from one generator-absorber to the other; a unitary snap-action thermostatic device for actuating said switching means, comprising a member operatively connected to said switching means and movable between two operating positions, spring means cooperating with said movable member to move the latter from one operating position to the other, and vice versa, detent means for holding said member in its respective operating positions, a pair of temperature-responsive elements in thermal contact with respective generator-absorbers and adapted to load said spring means alternately in opposite directions, and separate means operable by respective temperature-responsive elements for releasing said detent means when the temperature in the generator-absorber being heated reaches a predetermined maximum, whereby said member is quickly moved from one operating position to the other by said spring means.

2. In absorption refrigerating apparatus of the class described and including two units operable intermittently and alternately in the absorption and expulsion phases, each unit having a generator-absorber adapted to be heated up and cooled down intermittently for the expulsion and absorption phase operations, respectively, of the units, means for heating said generator-absorbers, means for cooling said generator-absorbers, and means for switching said heating means and said cooling means from one generator-absorber to the other; a thermostat snap-action device for selectively controlling said switching means, comprising a member operatively connected to said switching means and movable from one operating position to the other, and vice versa, latch means for holding said member in each of its operating positions, pivoted spring means operatively connected to said member, separate elements responsive to the temperature in respective generator-absorbers and movable from a retracted position to an extended position, said elements cooperating with said spring means to load the latter alternately in opposite directions, and separate means each operable by respective temperature-responsive elements for releasing said latch means when the temperature in the generator-absorber being heated reaches a predetermined maximum, whereby said member is quickly moved from one of its operating positions to the other by said spring means.

3. In absorption refrigerating apparatus of the intermittent type, including two generator-absorbers, a flue in each generator-absorber, and a burner cooperating with said flues and rockable from a position in which it supplies heat to one generator-absorber to a position in which it supplies heat to the other generator-absorber; a unitary snap-action thermostatic device for rocking said burner from one position to the other, comprising a member operatively connected to said burner and movable between two operating positions, spring means cooperating with said movable member to move the latter from one operating position to the other, and vice versa, resisting means for holding said member in each of its operating positions, a pair of temperature-responsive elements in thermal contact with respective generator-absorbers and adapted to load said spring means alternately in opposite directions, and separate means operable by respective temperature-responsive elements for selectively releasing said resisting means when the temperature in the generator-absorber being heated reaches a predetermined maximum, whereby said member is quickly moved from one operating position to the other by said spring means.

4. In absorption refrigerating apparatus of the intermittent type and including two generator-absorbers, a gas burner for each of said generator-absorbers, main valve means for controlling the supply of gas to each gas burner, a pilot jet for each of said burners, and reducing valve means for controlling each pilot jet; a unitary snap-action thermostatic device for selectively controlling said gas burners and said pilot jets, comprising a rocking member operatively connected to said main and reducing valve means and movable between two operating positions, one of said operating positions opening the main and reducing valve means to one gas burner and closing the corresponding valve means to the second gas burner, and the other operating position closing the main and reducing valve means of the first gas burner and opening the corresponding valve means to the second gas burner, spring means cooperating with said rocking member to move the latter from one operating position to the other, and vice versa, detent means for holding said rocking member in each of its operating positions, a pair of temperature-responsive elements in thermal contact with respective generator-absorbers, adapted to load said spring means alternately in opposite directions, and separate means each operable by respective temperature-responsive elements for releasing said detent means when the temperature in the generator-absorber being heated reaches a predetermined maximum, whereby said rocking member is quickly moved from one operating position to the other by said spring means.

NILS ERLAND AF KLEEN.